United States Patent [19]

Mackiewicz

[11] Patent Number: 5,704,693
[45] Date of Patent: Jan. 6, 1998

[54] HYDRAULIC AND ELECTRIC POWERED PARKING BRAKE SYSTEM

[75] Inventor: John Edmund Mackiewicz, Niles, Mich.

[73] Assignee: Robert Bosch Technology Corp., Farmington Hills, Mich.

[21] Appl. No.: 691,474

[22] Filed: Aug. 2, 1996

Related U.S. Application Data

[63] Continuation of Ser. No. 392,440, Feb. 22, 1995, abandoned.

[51] Int. Cl.⁶ ............................................. B60T 13/22
[52] U.S. Cl. ............................ 303/3; 303/15; 303/20
[58] Field of Search ............................ 188/170, 353, 188/276; 303/3, 15, 10, 11, 13, 89, 9.76, 9

[56] References Cited

U.S. PATENT DOCUMENTS

| | | | |
|---|---|---|---|
| 3,093,213 | 6/1963 | Limoges et al. | 303/3 |
| 3,802,745 | 4/1974 | Strifler et al. | 303/3 |
| 3,827,758 | 8/1974 | Hansen | 303/3 |
| 4,400,039 | 8/1983 | Ogata | 303/3 |
| 4,819,992 | 4/1989 | Angelillo et al. | 303/3 |
| 4,861,115 | 8/1989 | Petersen | 303/15 |
| 5,203,616 | 4/1993 | Johnson | 180/170 |
| 5,310,251 | 5/1994 | Towers . | |
| 5,370,449 | 12/1994 | Edelen et al. | 303/15 |

FOREIGN PATENT DOCUMENTS

93/09012  5/1993  WIPO .

*Primary Examiner*—Matthew C. Graham
*Attorney, Agent, or Firm*—Leo H. McCormick, Jr.

[57] ABSTRACT

The hydraulic and electric powered parking brake system (10) comprises a redundant or simultaneous operation of the system (10) to meet Federal Safety Standards. A dash mounted control knob (24) operates a hydraulic brake application mechanism (20) which transmits a hydraulic pressure to a hydraulically operated pilot piston (70). The control knob (24) also operates a switch (30) to send an electrical signal to an electrical control unit (100) which sends an electrical signal to a solenoid (80). The solenoid (80) and hydraulic pilot piston (70) can be operated, independently or simultaneously, to displace a control valve (60) located within a parking actuator assembly (114) and effect the release of hydraulic pressure from spring apply and hydraulic release actuators (16, 90) connected to vehicle brakes (18). The hydraulic fluid is released past the control valve (60) and to a reservoir (52). When the parking brake knob (24) is returned to an at-rest position, either the solenoid (80) or the hydraulic pilot piston (70), independently or simultaneously, can be operated to effect closing of the control valve (60) and actuation of a motor pump (50) which transmits fluid pressure to the spring apply and hydraulic release actuators (16, 90) so that the actuators will release the vehicle brakes (18) connected therewith.

13 Claims, 3 Drawing Sheets

HYDRAULIC AND ELECTRIC POWERED PARKING BRAKE SYSTEM

This application is a continuation of applications Ser. No. 08/382,440 filed on Feb. 22, 1995, now abandoned.

The present invention relates generally to parking brake systems, and in particular to hydraulic and electrically powered parking brake systems for trucks or passenger cars.

Hydraulic parking systems have been utilized previously in vehicles to effect an application of the brakes while the vehicle is not being operated. Prior hydraulic parking systems typically contain a control valve on the dash panel of the vehicle and the control valve is actuated either electrically or manually. This results in two hydraulic lines extending the length of the truck or vehicle such that a slow actuation time occurs because fluid displacement along the length of the vehicle is required. Additionally, there tends to be few if any auxiliary inputs and safety features for such a system. Typical systems can be found in class 6 and 7 trucks which utilize hydraulic parking brake systems, and such systems could also be utilized for passenger cars.

It is highly desirable to provide an hydraulic and electric powered parking brake system which includes a short connection from the control valve to the mechanics which apply the brakes, to utilize an electrical control unit or ECU logic for fail-safe features, or use merely a timer for controlling the operation of the control valve, and with the remainder of the brake apply system utilizing standard components.

The present invention provides an hydraulic and electric parking brake system of a vehicle, comprising means for effecting an hydraulic brake application and located for operation by a vehicle operator, the hydraulic brake application means connected with a remotely located parking actuator assembly, the parking actuator assembly comprising pump means, reservoir means, control valve means, and hydraulic displacement means and solenoid means both cooperating with the control valve means, the hydraulic brake application means being connected with the hydraulic displacement means to effect a fluid communication therebetween, electrical control means connected with the hydraulic brake application means and solenoid means, at least one vehicle brake connected with means for applying the brake and including an hydraulic connection with the parking actuator assembly for effecting a hydraulic release of the brake applying means, whereby actuation by the vehicle operator of one of the hydraulic application means and electrical control means effects displacement of the control valve means so that fluid pressure at the brake applying means is released to permit the brake applying means to apply the vehicle brake.

The invention described in detail below with reference to the drawings which illustrate an embodiment in which.

Figure 1:
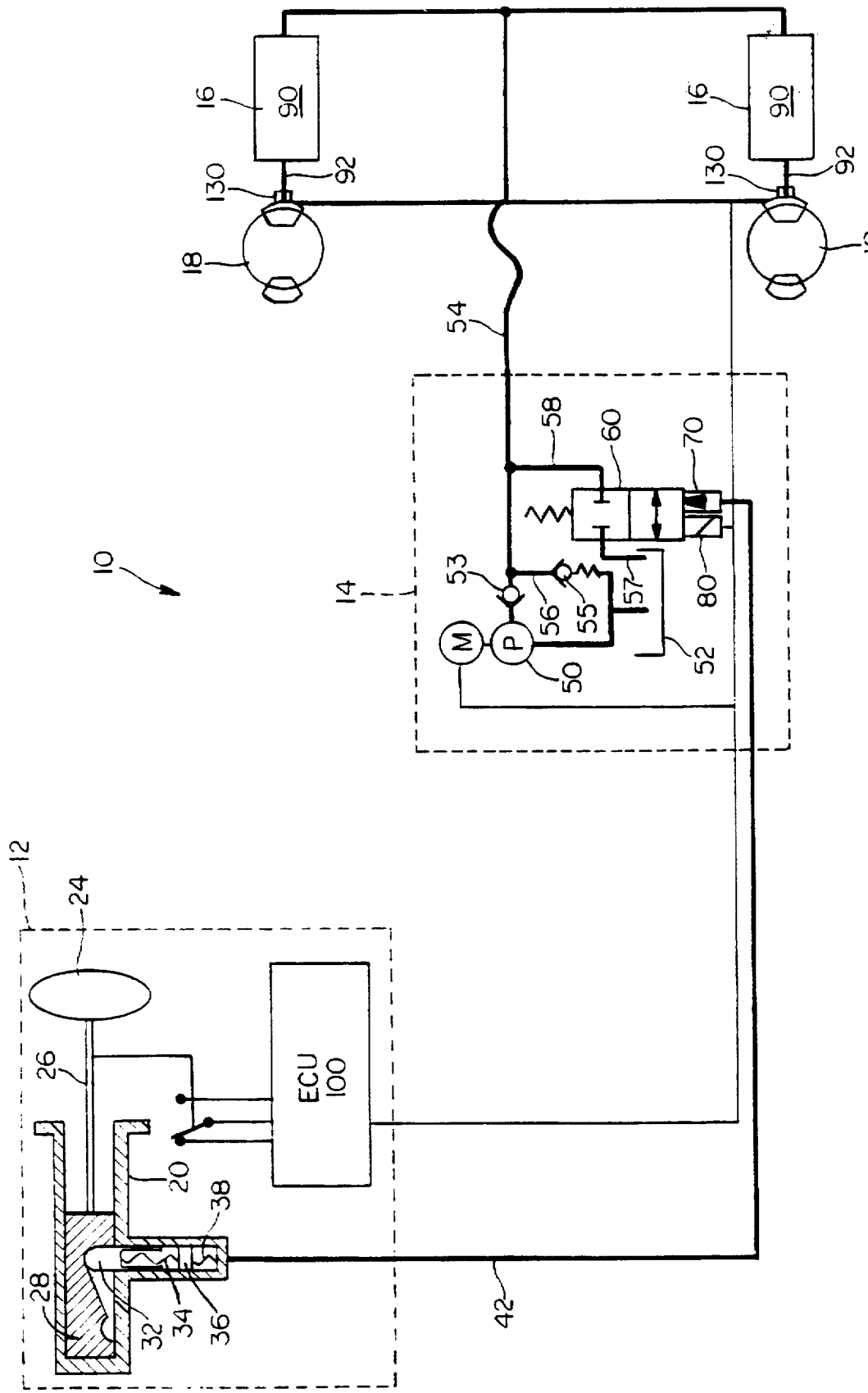
FIG. 1 is a schematic illustration of the parking brake system of the present invention.
Figure 2:
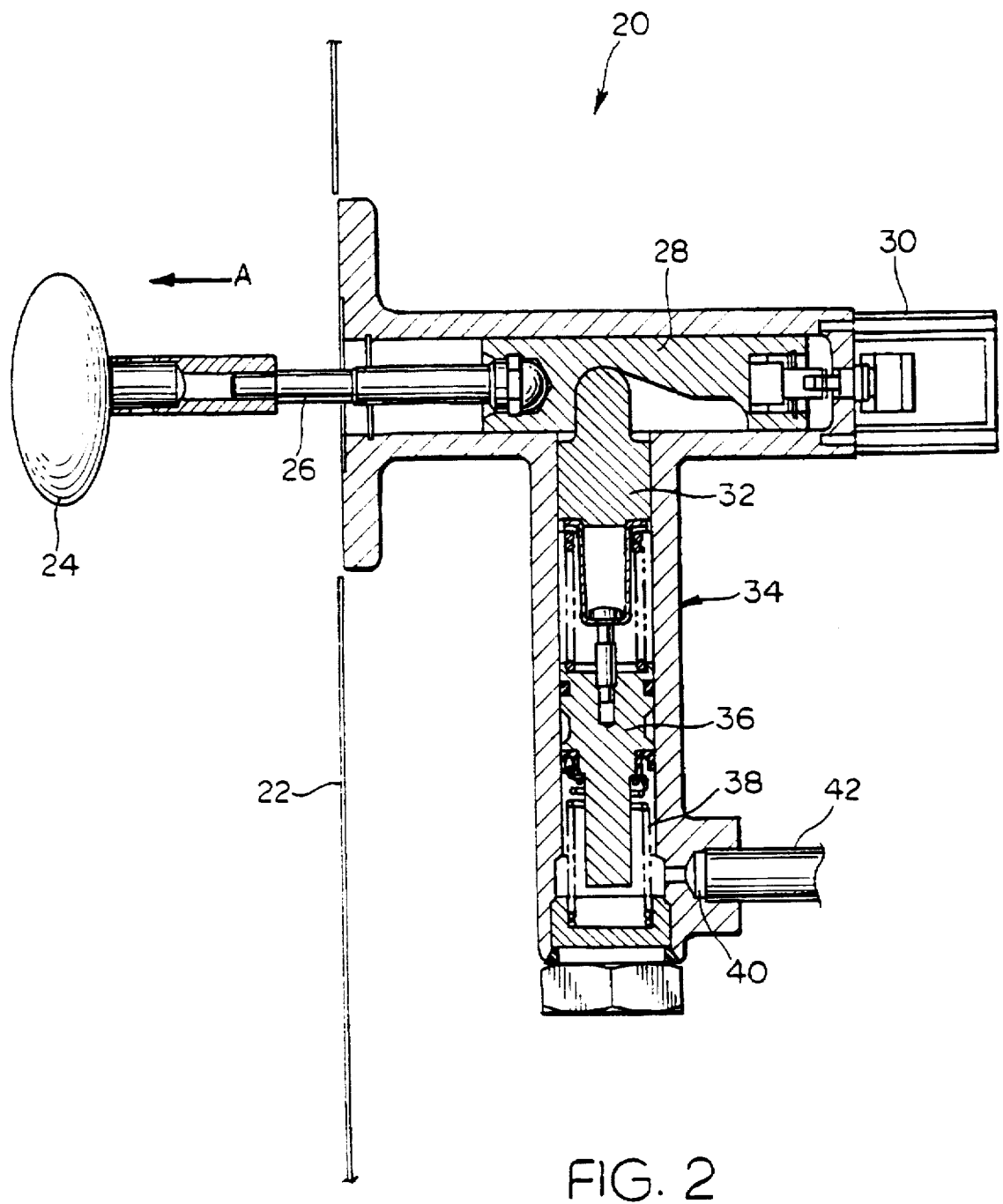
FIG. 2 is a section view of the hydraulic brake application mechanism of the present invention.

Referring to FIG. 1, the hydraulic and electric powered parking brake system is indicated generally by reference numeral 10. System 10 comprises a control system designated generally by reference numeral 12, a parking actuator assembly or fluid delivery system 14, mechanical brake applying means 16, and one or more brakes 18. The control system 12 includes an hydraulic brake application means 20 illustrated in detail in FIG. 2. The vehicle dashboard 22 has the hydraulic brake application means 20 mounted thereto with the manual actuator or parking knob 24 located on the passenger side of the dash panel. Knob 24 is connected via connector components 26 with a cam member 28. Cam member 28 is connected with an electric switch 30 that sends a position dependent signal to the electrical control unit or ECU 100. The cam 28 is engaged abuttingly by a plunger 32 which is connected via a caged spring mechanism 34 with a piston 36 biased by spring 38. Piston 36 can be displaced by moving the knob 24 in the direction of arrow "A" such that cam member 28 biases the plunger 32 downwardly against the caged spring assembly 34, resulting in the displaced piston 36 transmitting hydraulic fluid through outlet 40 and hydraulic line 42.

Referring to FIG. 1, the parking brake actuator assembly comprises an electrical motor pump 50 communicating with a reservoir 52 and an outlet line 54 which includes a check valve 53. A relief or check valve 55 is located in hydraulic line 56 connected with output line 54. Output line 54 is also connected via hydraulic line 58 with a control valve member or means 60. The control valve means may be operated by either one or both of an hydraulic displacement means or pilot piston means 70 and a solenoid means 80. The hydraulic displacement means communicates with hydraulic line 42 that communicates with the hydraulic brake application means 20.

Figure 3:
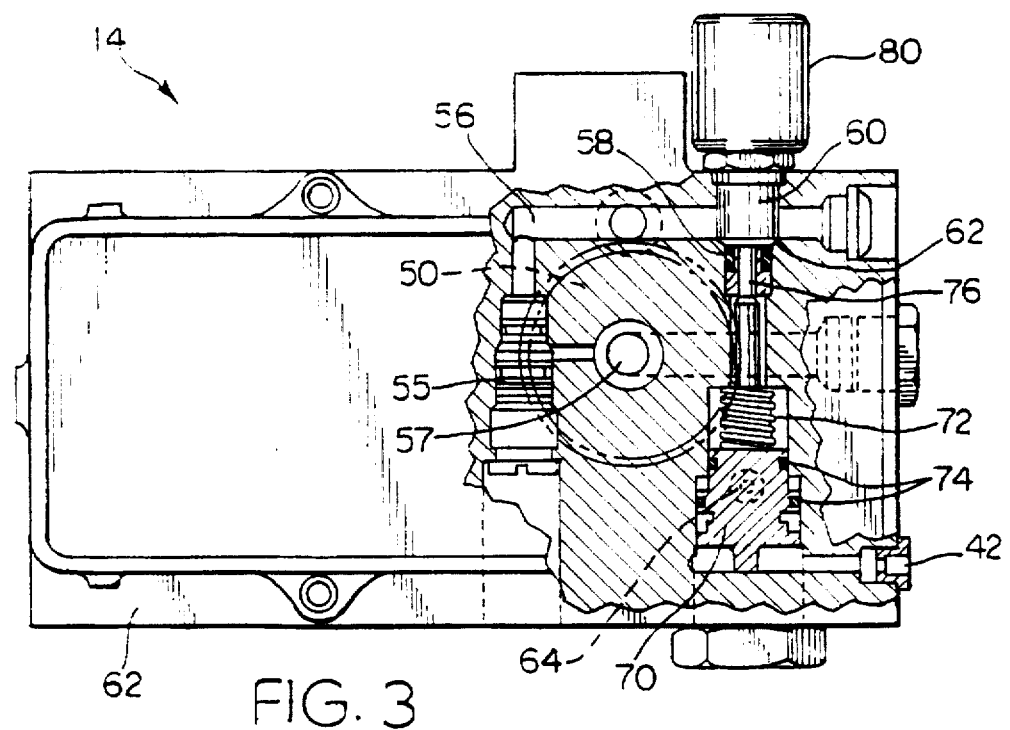
FIG. 3 is a section view of a portion of the parking actuator assembly.

Referring to FIG. 3, the parking actuator assembly 14 includes the housing 62 having therein the pilot piston 70, spring 72 biasing the pilot piston, connecting shaft member 76 coupled with the solenoid means 80 via control valve means 60 located at control valve seat 62. The electric motor pump 50 communicates with the reservoir via line 57 which also communicates with line 58 that is controlled via valve means 60. Hydraulic line 42 communicates fluid pressure to the head of pilot piston 70 which includes spaced-apart seals 74 between which is located a housing opening or seepage vent hole 64.

Figure 4:
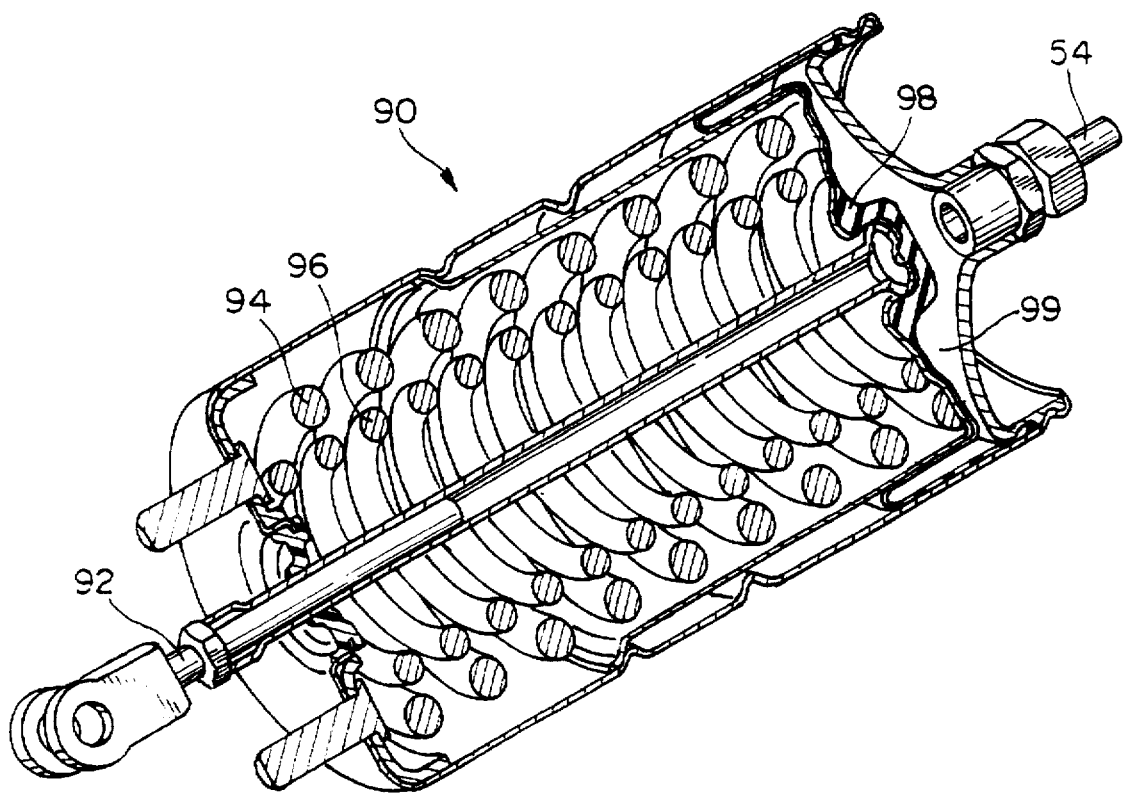
FIG. 4 is a isometric section view of the spring apply and hydraulic release mechanism of the present invention.

Referring to FIG. 1, the hydraulic line 54 connects the parking actuator assembly 14 with mechanical brake apply means 16 which is standard spring apply and hydraulic release actuators 90. The actuators 90 each have a rod connected to a brake actuator (not illustrated in detail) of a brake 18, with position switches 130 for each brake 18 present to provide an electrical signal to ECU 100. FIG. 4 illustrates the spring apply and hydraulic release actuator 90 which has a rod 92 biased by a pair of springs 94 and 96, with a rolling diaphragm 98 defining with actuator 90 a chamber 99 that receives hydraulic fluid via line 54 to displace the rod in a direction opposite the biasing force of springs 94 and 96.

The operation of the control system 10 may effect the following sequence, with many variations being available because of the flexibility of the system. When the vehicle operator initiates a parking brake application by pulling the knob 24, two applications could occur either independently or separately. First, the switch 30 of the hydraulic brake application means 20 provides an electrical signal to the ECU 100 that a parking brake application has been commanded by the vehicle operator. The ECU provides a time delayed electrical signal to energize the solenoid means 80, causing subsequently the control valve means 60 to open and effect venting of the stored hydraulic pressure in chamber 99 of the mechanical brake applying means 16. The stored hydraulic pressure is transmitted via hydraulic lines 54, 58 and 57 to reservoir 52, thus allowing the springs 94 and 96 of mechanical brake applying means 16 to displace the rod 92 and effect operation of the brake actuators and brakes 18. The brakes are held in the apply position by the force of the springs in the mechanical brake applying means 16. Redundantly, the motion of the operator pulling the knob 24 causes cam member 28 to displace plunger 32 against caged spring mechanism 34 that causes piston 36 to be displaced and transmit fluid via line 42 to the hydraulic displacement means or pilot piston 70. The transmitted fluid pressure causes displacement of the pilot piston 70 against the spring 72 such that the control valve means 60 is opened and the venting of the fluid pressure in chambers 99 of the mechanical brake applying means 16 is effected. If the parking brake application is initiated via an auxiliary electrical signal to the electrical control unit 100, then ECU 100 provides a time delay electrical signal to energize solenoid means 80 thereby causing control valve means 60 to open and effect venting of the stored fluid in the chambers 99 and allow the springs 94, 96 to extend the control rods 92 and effect a parking brake application. Thus, the hydraulic brake application means 20, ECU 100, or an auxiliary electrical signal may be utilized to effect a parking brake application.

To effect a parking brake release, the vehicle operator pushes the knob 24 back into dash panel 22. This causes the switch 30 to send an electrical signal to ECU 100 that a parking brake release has been initiated by the vehicle operator. The ECU 100 will then deenergize (if required) solenoid means 80 which returns the control valve means 60 to a closed position and also energizes the electric motor pump 50 (optionally, after venting the chamber 99 during a parking brake application, the solenoid means 80 could be deenergized). Simultaneously, control valve means 60 will be permitted to close via the biasing force of spring 72 as a result of the fluid pressure in line 42 being released as piston 36 of the hydraulic brake application means 20 retracts as a consequence of cam 28 being returned to the at-rest position illustrated in FIG. 2. The activated motor pump 50 draws fluid from the reservoir 52 and provides fluid under pressure to charge the chambers 99 of the mechanical brake applying means 16 and effect displacement of rods 92, causing the brake actuators to release brakes 18. The motor pump 50 will continue to supply fluid until the position switches 130 signal that the mechanical brake applying means 16 have been adequately charged with fluid. If the parking brake application was initiated via an auxiliary electrical signal (such as from PRNDL positioning), the ECU 100 will then deenergize (if required) solenoid means 80 to effect retraction of control valve means 60 and energize the motor pump. The motor pump will then effect a release of the brakes in the manner described above.

The present invention provides significant improvements over prior parking brake systems. First, the pilot piston 70 which is operated hydraulically may provide either the primary or backup system for operating the brakes. Thus, if there is a failure of electrical power the parking brake system can be operated hydraulically to open the control valve means 60 and effect operation of the system. Second, the system has a self-checking feature via the timed delay electrical operation of the system; in other words, the system has the capability of checking the operation of the hydraulic pilot piston 70 each time the knob 24 is pulled by the operator and electrical power is available to the system. When the knob 24 is pulled by the vehicle operator, and a signal via switch 30 is sent to the ECU 100, the ECU can then await a signal from position switches 130 which signifies that control valve means 60 has opened via the hydraulic pilot signal transmitted via line 42 and effected by pilot piston 70, so that the ECU determines that the parking brake application is beginning. This verifies the correct and proper operation of the hydraulic pilot apply sequence. If the ECU 100 did not receive such signal from the position switches 130 signifying proper operation of the hydraulic pilot apply sequence within a preset time from when the ECU receives the electrical signal from switch 30, then ECU 100 energizes the solenoid means 80 to effect displacement of control valve means 60 and accomplish the parking brake application which was commanded by the operator. An alert to the operator would then be furnished via a dash mounted brake system warning lamp. This design feature provides a redundant parking brake apply capability in the event that the hydraulic pilot apply became inoperable, and provides the operator with a warning indication while effecting the parking brake application electrically via the solenoid means 80. A third feature of the system is the capability of simultaneous operation as an alternative; the hydraulic and electrical control features of the system can operate simultaneously within a system that does or does not have an electrical control unit 100. The system 10 can be configured to effect a parking brake application whenever a hydraulic pilot signal or electrical signal is initiated from the dash control knob 24. The difference between this approach and the previously described approach would be not to wait and check if the hydraulic pilot operation of the control valve means 60 has occurred, but rather immediately and redundantly energize control valve means 60 via immediate operation of solenoid means 80.

Fourth, the system can be configured to allow direct or filtered energization of the solenoid means 80 via electrical inputs such as, but not limited to the PRNDL (parking, reverse, neutral, drive, low positions of a gear shift lever and switch), impact sensitive bumpers and guard systems on vehicles such as school buses. An example of the PRNDL approach would be for certain large vehicles that have automatic transmissions with a second neutral position that is labeled as a parked position. Due to design difficulties, this position does not mechanically lock the transmission/drive train and therefore does not prevent the vehicle from moving (whereas most passenger cars do prevent the vehicle from moving when the automatic transmission is in the parked position). The present invention can provide this feature by automatically applying the brakes for a parking application when the operator shifts the transmission into the parked position. Depending on the system configuration and required interlocks, the system can possess the capability of releasing the brakes from a parking application when the operator moves the transmission selector out of the parked position. Next, the system has the capability of preventing the release of the brakes unless the position switches 130 are in the "applied" position. Therefore, merely pushing the knob in will not effect a release of the brake. The ECU can be programmed to ensure such operation. Additionally, auxiliary inputs to the ECU can utilized to require a coded input so that an anti-theft feature is provided.

An anti-rollaway feature can be provided when system 10 employs an ECU 100, such that the logic of the system has the capability of preventing the vehicle from releasing the brakes upon vehicle ignition system energization if the knob 24 or the switch 30 was moved to the release position when the vehicle ignition is off. This can prevent a situation where an operator who left the vehicle with the brakes applied, energizes the vehicle ignition system without being aware of an inadvertent release of the system 10 while the vehicle was parked, such that the release of the brake would surprise the vehicle operator.

The hydraulic brake application means includes a failsafe feature in case line 42 should become plugged. If for some reason line 42 should become plugged, the caged spring mechanism 34 permits the vehicle operator to pull the knob 24 to the apply position even when the piston 36 cannot be moved forward. This occurs as a result of the caged spring mechanism 34. The spring mechanism 34 absorbs the normal stroke of the plunger 32, which allows the switch 30 to be operated and cam member 28 to reach the extended or latched position. Such displacement of cam 28 and operation of switch 30 effects a signal to the electrical control unit 100, energiziation of solenoid means 80, and displacement of the control valves means 60 so that a parking brake application is effected. If this feature were not present in system 10, then the displacement of knob 24 and the resulting parking brake application could not be accomplished either hydraulically or electrically and no parking brake application would occur. The preload of the caged spring mechanism 34 is designed to ensure that under normal operating conditions the spring therein does not compress before a sufficient pressure is developed in line 42 so that control valve means 60 will be opened.

The system 10 can utilize separate fluids therein. The hydraulic brake application means 20, line 42, and pilot piston 70 can be operated with a fluid different from that contained in the remainder of system 10. The system 10 has been designed with such fluid isolation capability present via the two pilot piston seals 74. The axially spaced-apart seals prevent the exposure of one type of fluid in hydraulic line 42 to a different type of fluid in the remainder of the system. The bore and stroke of pilot piston 70 ensure that normal lubrication during the operational stroke of each seal 74 does not overlap and allow transfer of either type of fluid to the stroke location of the other fluid seal. A drain or vent hole 64 is provided in housing 62 between seals 74 to allow seepage to be vented outside the unit, thus preventing accumulation that could ultimately transfer to the stroke location of the other fluid seal.

Finally, system 10 can be used with in-wheel disc brake subcomponents to constitute a rock free platform vehicle. The system can be configured to include at least two wheels and axle by axle thereafter. Also, the system can be used with driveline brake subcomponents to provide an alternately powered parking system.

I claim:

1. Control means (12) for a redundant hydraulic and electric parking brake system (10) of a vehicle, said control means (12) including an actuator assembly (24) for activating a fluid delivery system (14) to effect an application of a remotely located parking assembly (90) by a spring (94,96), said fluid delivery system (14) including pump means (50), reservoir means (52), valve means (60), hydraulic displacement means (70) and solenoid means (80), said actuator assembly (24) being connected with said fluid delivery system (14) to effect a fluid communication therebetween, said control means (12) including electrical means (100) which is connected with said actuator assembly (24), said fluid delivery system (14), said solenoid means (80), and at least one vehicle brake (18) of said vehicle, said pump means (50) and said reservoir means (52) supplying said parking assembly (90) with fluid pressure to hold said spring (94,96) in a released position, said control means (12) responding to an operator input applied to said actuator assembly (24) to activated said hydraulic displacement means (70) and said solenoid means (80) for operating said valve means (60) whereby fluid pressure present in the parking assembly (90) is released and said spring (94,96) is thereafter allowed to provide a force for applying said vehicle brake (18), said actuator assembly comprising:

a housing having a bore therein for retaining a plunger (32), said bore being connected by a line (42) to said hydraulic displacement means (70) of said fluid delivery system (14);

a cam member (28) connected to an input rod (26) and said plunger (32);

a switch member (30) connected to said cam member (28) for supplying said electrical means (100) with an input corresponding to the position of said cam member (28) within said bore for activating said solenoid means (80);

a piston (36) located in said bore and separated from said plunger (32) by a caged spring (34);

a return spring (38) located in said bore and acting on said piston (36) for urging said plunger (32) into engagement with said cam member (28), said cam member (28) being displaced by said input rod (26) to provide said plunger (32) with a corresponding input force which overcomes said return spring (38) and moves said piston (36) within said bore to supply hydraulic fluid to move said hydraulic displacement means (70) and operate said valve means (60) and allow said spring (94,96) to provide said force to apply said vehicle brake (18), said caged spring (34) allowing said cam member (28) to independently move said plunger (32) if said piston (36) remains in a substantially fixed position within said bore such that an input from said electric means (100) activates said solenoid means (80) to independently operate said valve means (60) and allow said spring (94,96) to provide said force to apply said vehicle brake (18).

2. The control means (12) in accordance with claim 1, wherein said parking assembly (90) is characterized by a spring apply and hydraulic release through a rod (92) biased in one direction by said spring (94,96) and displaceable in the opposite direction by means of fluid pressure received in a chamber (99) located between one end of the parking assembly (90) and a diaphragm member (98) located at an end of the rod (92).

3. The control means (12) in accordance with claim 2, further characterized by means (130) for sensing the mode of the vehicle brake (18) to determine if the vehicle brake is in one of applied and not applied modes.

4. The control means (12) in accordance with claim 1, wherein the hydraulic displacement means (70) is characterized by a pilot piston connected mechanically with the solenoid means (80), said pilot piston being continually biased by resilient means (72).

5. The control means (12) in accordance with claim 4, wherein said pilot piston (70) is characterized by a pair of axially spaced-apart seals (74) and a seepage outlet (64) is located therebetween in the hydraulic displacement means (70).

6. The control means (12) in accordance with claim 4, wherein the pilot piston (70) and valve means (60) are characterized by being connected by a shaft member about which is located the resilient means (72).

7. The control means (12) in accordance with claim 2, wherein the solenoid means (80) and pilot piston (70) are characterized by being located opposite one another and connected via the valve means (60) such that when said valve means (60) is closed the pump means (50) can displace fluid past the closed valve means (60) and through the hydraulic connection (54) to said parking assembly (90) to apply a vehicle brake (18).

8. The control means (12) in accordance with claim 1, wherein said hydraulic displacement means (70) is characterized by being returnable to an at-rest position which causes a return of the valve means (60) and actuation of the pump means (50) to transmit fluid to the parking assembly (90) and effect a release of the vehicle brake (18) after overcoming said spring (94,96).

9. The control means (12) in accordance with claim 1, wherein the electrical control means (100) is characterized by sending an actuation signal to the solenoid means (80) when a preset period of time elapses after receiving a signal derived from the movement of actuator (24).

10. The control means (12) in accordance with claim 2, wherein a position indication means (130) of the vehicle brake is characterized by sending a signal to the electrical means (100) to prevent the sending of an actuation signal to said solenoid means (80).

11. The control means (12) in accordance with claim 1, wherein the said piston (36) of said actuator assembly (14) and electrical control means (100) are characterized by simultaneously actuation to displace fluid and substantially effect the operation of parking assembly (90).

12. The control means (12) in accordance with claim 1, wherein the operation of the electrical means (100) is effected by an auxiliary input from at least one of a gear shift indicator, impact sensitive bumper, and an anti-theft coded mechanism effects operation of the solenoid means (80).

13. The control means (12) in accordance with claim 1, wherein the electrical means (100) is characterized by being programmed to prevent a vehicle ignition system energization from actuating the pump means (50) if the hydraulic displacement means (70) was moved previously to a deactuated position.

* * * * *